US 6,461,491 B1

(12) United States Patent
Hryn et al.

(10) Patent No.: US 6,461,491 B1
(45) Date of Patent: Oct. 8, 2002

(54) METHOD AND APPARATUS FOR ELECTRODIALYSIS PROCESSING

(75) Inventors: John N. Hryn, Naperville; Kandipati Sreenivasarao, Des Plaines, both of IL (US)

(73) Assignee: The University of Chicago, Chicago, IL (US)

( * ) Notice: Subject to any disclaimer, the term of this patent is extended or adjusted under 35 U.S.C. 154(b) by 5 days.

(21) Appl. No.: 09/589,329

(22) Filed: Jun. 7, 2000

(51) Int. Cl.$^7$ ............................................ B01D 61/44
(52) U.S. Cl. ...................... 204/523; 204/525; 204/529; 204/634
(58) Field of Search ................................ 204/523, 525, 204/529, 634

(56) References Cited

U.S. PATENT DOCUMENTS

| | | | |
|---|---|---|---|
| 3,296,112 A | * 1/1967 | Kollsman | 204/523 |
| 3,657,105 A | 4/1972 | Veld | 204/301 |
| 4,160,713 A | 7/1979 | Matsuzaki et al. | 204/180 |
| 4,707,240 A | * 11/1987 | Parsi et al. | 204/525 |
| 5,330,618 A | 7/1994 | Daniels et al. | 159/47.1 |

OTHER PUBLICATIONS

"Concentration and Precipitation of NaCl and KCl from Salt Cake Leach Solutions by Electrodialysis", K. Sreenivasarao, F. Patsiogiannis, and J.N. Hryn, *Light Metals*, 1997, pp. 1, 153–1, 158 (no month).

"Recycling of Water in Bleached Kraft Pulp Mills by Using Electrodialysis", 1999 TAPPI International Environmental Conference and Exhibit, Nashville, Tennessee, Apr. 18–21, 1999.

* cited by examiner

*Primary Examiner*—Arun S. Phasge
(74) *Attorney, Agent, or Firm*—Joan Pennington

(57) ABSTRACT

An electrodialysis apparatus includes a stack of alternating cation and anion semi-permeable, ion-selective membranes disposed between a positive DC potential anode electrode and a negative DC potential cathode electrode. The cation and anion selective membranes can be selective for monovalent or multivalent ions and form compartments therebetween through alternate compartments of which flow concentrate and diluate solutions such that the concentrate and diluate solutions are separated from each other by the ion selective membranes. Due to the potential maintained across each of the compartments and the cation and anion selective membranes separating the compartments, cations and anions as well as water will migrate from the diluate solution to the concentrate solution. An anode electrode rinse solution is circulated through an outer most compartment adjacent to the anode electrode and a separate cathode electrode rinse solution is circulated through an outer most compartment adjacent to the cathode electrode.

13 Claims, 8 Drawing Sheets

METHOD AND APPARATUS FOR ELECTRODIALYSIS PROCESSING

CONTRACTUAL ORIGIN OF THE INVENTION

The United States Government has rights in this invention pursuant to Contract No. W-31-109-ENG-38 between the United States and The University of Chicago.

BACKGROUND OF THE INVENTION

1. Field of the Invention

The present invention relates to an electrodialysis apparatus and method used for transferring dissolved salts or impurities from a waste or other solution (commonly known as a diluate solution) into a concentrate solution, and more particularly, to a new and improved electrodialysis apparatus and electrodialysis process that enables the transfer of such dissolved salts or impurities from such a waste or other diluate solution into a concentrate solution without the precipitation of certain insoluble compounds adjacent the cathode of the electrodialysis apparatus or the liberation of chlorine gas at the anode of the electrodialysis apparatus or the liberation of ammonia at the cathode of the electrodialysis apparatus.

2. Background of the Invention

Electrodialysis (ED) is used in connection with the separation of dissolved salts or other impurities from one aqueous solution to another aqueous solution. The separation of these dissolved salts or other impurities results from ion migration through semi-permeable, ion-selective membranes under the influence of an applied direct current field that is established between a cathode (negative potential electrode) and an anode (positive potential electrode). The membranes may be selective for monovalent or multivalent ions depending on whether separation is desired between monovalent or multivalent cations and/or anions. The separation process results in a salt or impurity concentrated stream (known as a concentrate or brine) and in a salt or impurity depleted stream (known as a diluate). The concentrate and diluate streams flow in solution compartments in the electrodialysis apparatus that are disposed between the anode and cathode and that are separated by alternating cation and anion selective membranes. The outer most compartments adjacent the anode and cathode electrodes have a recirculating electrode-rinse solution flowing therethrough to maintain the cathode and anode electrodes clean. A schematic of one type of electrodialysis apparatus is illustrated in FIG. 1.

The electrodialysis apparatus 20 shown in FIG. 1 has a series of alternating cation semi-permeable, ion-selective membranes C and anion semipermeable, ion-selective membranes A disposed between a positive DC potential anode electrode 22 and a negative DC potential cathode electrode 24. The cation-selective membranes C and the anion selective membranes A form compartments therebetween. As indicated in FIG. 1, concentrate and diluate solutions flow as indicated respectively by arrows 26 and 28 through adjacent compartments such that the concentrate and diluate solutions are separated from each other by the ion-selective membranes. The diluate solutions may contain salts (such as sodium chloride (NaCl)) or impurities (such as sodium chloride (NaCl) in acidic magnesium chloride ($MgCl_2$) solutions or calcium chloride ($CaCl_2$) and magnesium chloride ($MgCl_2$) in sodium chloride (NaCl) and potassium chloride (KCl) solutions). Due to the potential maintained across each of the compartments and cation and anion selective membranes separating the compartments, cations (such as acid (H), sodium (Na), magnesium (Mg), calcium (Ca) and potassium (K)) and anions (such as chloride (Cl)) as well as water (hydration shell and osmosis) will tend to migrate from the diluate solution to the concentrate solution. Once these cations and anions are in the concentrate solution, they can be recovered and used for commercial purposes. Additionally, the purified or salt-depleted diluate solution also may have an increased commercial value.

As further indicated in the schematic of FIG. 1, an electrode rinse solution is circulated in an outer most compartment 30 adjacent to the anode 22 and an outer most compartment 32 adjacent to the cathode 24. During the electrodialysis process, hydrogen tends to be evolved at the cathode 24 and oxygen tends to be evolved at the anode 22. As a result, the pH level in the electrode rinse solution that is circulating through the compartment 32 adjacent the cathode 24 increases while the pH level of the electrode rinse solution that is circulating through the compartment 30 adjacent the anode 22 decreases. In view of the fact that the electrode rinse solution is mixed after flowing through the compartments 30 and 32, the increase and decrease in the pH level of the electrode rinse solution used in the electrodialysis apparatus 20 tends to be neutralized.

The circulation of fluids through an electrodialysis apparatus, such as the electrodialysis apparatus 20, is shown schematically in FIG. 2 of the drawings. As shown therein, the diluate solution is pumped from and to a diluate tank 34 through the diluate compartments formed between the cation C and anion A selective membranes (labeled ED stack in FIG. 2) by a diluate pump 36. In a like manner, the concentrate solution is pumped from and to a concentrate tank 38 through the concentrate compartments formed between the cation C and anion A selective membranes (ED stack) by a concentrate pump 40. As the diluate solution flows through the diluate compartments, cations, anions and water from the diluate solution migrate through the cation C and anion A selective membranes to the concentrate solution. In addition, an electrode rinse solution is pumped by an electrode rinse solution pump 42 from an electrode rinse solution tank 44 through the compartments 30 and 32 adjacent respectively of the anode 22 and the cathode 24. As previously indicated, any changes in the pH level of this electrode rinse solution is neutralized when the electrode rinse solution is mixed together as it flows from the compartments 30 and 32 to the electrode rinse solution tank 44.

While the use of one electrode rinse solution has the advantage that changes to the pH level of the solution as it flows through the compartments 30 and 32 are neutralized, precipitates tend to form on the ion-selective membrane forming a side of the compartment 32 adjacent to the cathode 24. In this regard, reference can be made to FIGS. 3–8 of the drawings. These figures diagrammatically illustrate the types of precipitates that might be formed on a cation selective membrane that is disposed on a side of the compartment 32 adjacent the cathode 24. It should be noted that the membrane arrangement in FIGS. 3–8 is different from the arrangement in FIG. 1, but this has no bearing on the present invention.

FIG. 3 illustrates what might occur when an electrode rinse solution of sodium hydroxide (NaOH) is used in an electrodialysis apparatus in which is treated pickle liquors from the steel industries which liquors contain chloride, iron and/or manganese ions. The NaOH electrode rinse solution is generally a basic solution having a pH level of about 14. While the electrodialysis apparatus enables the removal of iron and/or manganese from those liquors, iron hydroxide ($Fe(OH)_3$) and/or manganese hydroxide ($Mn(OH)_3$) precipitates tend to form on the diluate side of the cation ion selective membrane on the side of the compartment 32. The reason that such precipitates form is due to the migration of iron and/or manganese ions towards the cathode 24 that react with the hydroxide ions of the NaOH electrode rinse solution flowing through the compartment 32. Such precipitates on the cation ion selective membrane are detrimental to the functioning of the electrodialysis apparatus 20 because the precipitates tend to block or interfere with the transfer of iron or manganese ions across that membrane.

FIG. 4 similarly illustrates what might occur when the NaOH electrode rinse solution is used in an electrodialysis apparatus in which is being treated effluents from the pulp and paper industry. Those effluents contain chloride and calcium ions. When these effluents are treated in an electrodialysis apparatus (such as the electrodialysis apparatus 20) to remove chloride and calcium ions, calcium hydroxide ($Ca(OH)_2$) precipitates tend to form on the diluate side of the cation ion selective membrane on the side of the compartment 32. The reason that such precipitates form is due to the migration of calcium ions towards the cathode 24 that react with the hydroxide ions of the NaOH electrode rinse solution flowing through the compartment 32. Such calcium hydroxide precipitates on the cation ion selective membrane are detrimental to the functioning of the electrodialysis apparatus 20 because the precipitates tend to block or interfere with the transfer of the calcium ions across that membrane.

The detrimental formation of such precipitates occurs even if a more neutral, but basic type electrode rinse solution (pH level greater than 7) is used. In this regard, reference can be made to FIGS. 5 and 6 of the drawings. As illustrated in those figures, sodium nitrate can be used as the electrode rinse solution (in the alternative sodium sulfate likewise can be used). Such an electrode rinse solution has a pH level that is greater than 7. However, the pH level of the electrode rinse solution and the diluate tend to increase during the electrodialysis processing of pickle liquors causing the formation of iron and manganese hydroxide precipitates to be formed (FIG. 5) or during the electrodialysis processing of effluents from the pulp and paper industry causing the formation of calcium hydroxide precipitates to be formed (FIG. 6). In both of these instances, the precipitates form on the side of the membrane forming the side of the compartment 32.

The pH level of the $NaNO_3$ electrode rinse solution can be lowered to the acidic range (a pH level below 7) using sulfuric acid. This tends to eliminate the problem of the formation of precipitates of iron and manganese hydroxide in the case of the electrodialysis processing of pickle liquors or the formation of precipitates of calcium hydroxide in the case of the electrodialysis processing of effluents from the pulp and paper industry. However, the use of such an acidic electrode rinse solution tends to cause another problem, i.e., chlorine gas liberation at the anode. In this regard, reference can be made to FIGS. 7 and 8 of the drawings. As illustrated in those FIGS. 7 and 8, the use of an acidic electrode rinse solution flowing through the compartment 30 adjacent the anode 22 tends to cause the migration of chloride ions from the diluate solution through the cation selective membrane forming the side of the compartment 30 to the electrode rinse solution. This happens because the $H^+$ ions in the acidic electrode rinse solution react with the negative functional groups on the cation selective membrane on the side of the compartment 30 rendering the membrane useless as a cation exchange membrane. In particular, the functional groups on the cation exchange membrane become neutral after reacting with the $H^+$ ions and as a result, the membrane is no longer ion selective such that the $Cl^-$ ions are allowed to pass through.

Similar type problems discussed above with respect to the electrodialysis processing of effluents from the pulp and paper industry and of pickle liquors also occur when the electrodialysis apparatus 20 is used to process magnesium chloride ($MgCl_2$) rich aqueous streams. Such streams may be produced in two ways: (1) Elemental magnesium (Mg) can be remelted under a salt blanket. When is so remelted, some magnesium (Mg) is left in the salt and when the salt is solubilized, an aqueous stream containing magnesium (Mg), sodium (Na) and calcium (Ca) is produced. (2) Impure $MgO.SiO_2$ or other source of magnesium (Mg) is leached in a HCl solution resulting in the production of an aqueous stream containing Mg, H (acid), Na and Ca, in which Ca, H (acid), and Na are considered impurities. When these streams are processed by electrodialysis to remove H (acid) and Na utilizing monovalent selective membranes to thereby produce high quality magnesium chloride aqueous solution, and the same electrode rinse solution is used for the anode and cathode electrodes, either chlorine gas is liberated from the electrode rinse solution (such as an acidified $NaNO_3$ electrode rinse solution) flowing in the compartment 30 adjacent the anode 22 or a magnesium hydroxide precipitate forms on the ion selective membrane adjacent the cathode 24 when the electrode rinse solution is a more basic solution (for example, alkaline $NaNO_3$ or NaOH solutions).

Accordingly, it is an object of the present invention to provide a new and improved electrodialysis apparatus and method that eliminates the formation of detrimental precipitates on ion selective membranes adjacent the cathode of the electrodialysis apparatus and/or the liberation of chlorine gas adjacent the anode of the electrodialysis apparatus.

It is another object of the present invention to provide a new and improved electrodialysis apparatus and a method that enables the electrodialysis processing of an aqueous diluate and concentrate solutions so that impurities in the diluate solution migrate to the concentrate, or vice versa, without the formation of detrimental precipitates on ion selective membranes adjacent the cathode of the electrodialysis apparatus and/or the liberation of chlorine gas at the anode of the electrodialysis apparatus.

It is still another object of the present invention to provide a new and improved electrodialysis apparatus and method wherein separate anode and cathode electrode rinse solutions are utilized so that detrimental precipitates are not formed on ion selective membranes adjacent the cathode of the electrodialysis apparatus and/or chlorine gas is not liberated at the anode of the electrodialysis apparatus.

SUMMARY OF THE INVENTION

In accordance with these and many other objects of the present invention, an electrodialysis apparatus includes a series or stack of alternating cation semi-permeable, ion-selective membranes and anion semi-permeable, ion-selective membranes disposed between a positive DC potential anode electrode and a negative DC potential cathode electrode. The ion-selective membranes may or may not be monovalent selective. The cation selective membranes and the anion selective membranes form compartments therebetween through alternate compartments of which a concentrate solution is circulated and through other compartments of which a diluate solution is circulated such that the concentrate and diluate solutions are separated from each other by the ion selective membranes. The diluate solutions may contain salts (for example NaCl) or impurities (for example, sodium chloride (NaCl) and acid (HCl) in magnesium chloride ($MgCl_2$), or calcium chloride ($CaCl_2$) in sodium chloride (NaCl) and potassium chloride (KCl) solutions). Due to the potential maintained across each of the compartments and the cation and anion selective membranes separating the compartments, cations (such as acid (H), sodium (Na), magnesium (Mg), calcium (Ca) and potassium (K)) and anions (such as chloride (Cl)) as well as water (hydration shell and osmosis) will migrate from the diluate solution to the concentrate solution. Once these cations and anions are in the concentrate solution, they can be recovered and used for commercial purposes. Additionally, the purified or salt-depleted diluate solution may have an increased commercial value.

An anode electrode rinse solution is circulated through an outer most compartment adjacent to the anode electrode and a separate cathode electrode rinse solution is circulated through an outer most compartment adjacent to the cathode electrode. In one embodiment of the present invention, the anode electrode rinse solution is sodium hydroxide (NaOH) maintained at a basic pH level that is near 14 and the cathode electrode rinse solution is sodium chloride (NaCl) and/or potassium chloride (KCl) that are maintained at an acidic pH level of about 6. The use of these separate electrode rinse solutions tend to eliminate problems that occur when the same electrode rinse solution is used for both the anode and cathode electrodes. In particular, the acidic cathode electrode rinse solution tends to prevent the formation of detrimental precipitates (such as iron, manganese and magnesium hydroxides) on the membrane adjacent the cathode electrode and the basic anode electrode rinse solution tends to prevent the liberation of chlorine gas from adjacent the anode electrode or the liberation of ammonia from adjacent the cathode electrode depending on the impurities in the diluate solution. During the electrodialysis process, hydrogen tends to be evolved at the cathode and oxygen tends to be evolved at the anode. As a result, the pH level in the cathode electrode rinse solution that is circulating through the compartment adjacent the cathode tends to be increased so acid has to be continuously added to the cathode electrode rinse solution to maintain its acidic pH level and the pH level of the anode electrode rinse solution that is circulating through the compartment adjacent the anode tends to be decreased so a base has to be continuously added to the anode electrode rinse solution to maintain its basic pH level.

BRIEF DESCRIPTION OF THE DRAWINGS

These and many other objects and advantages of the present invention will become readily apparent from consideration of the following detailed description of the embodiments of the invention shown in the accompanying drawings wherein.

DETAILED DESCRIPTION OF THE PREFERRED EMBODIMENT

Figure 1:
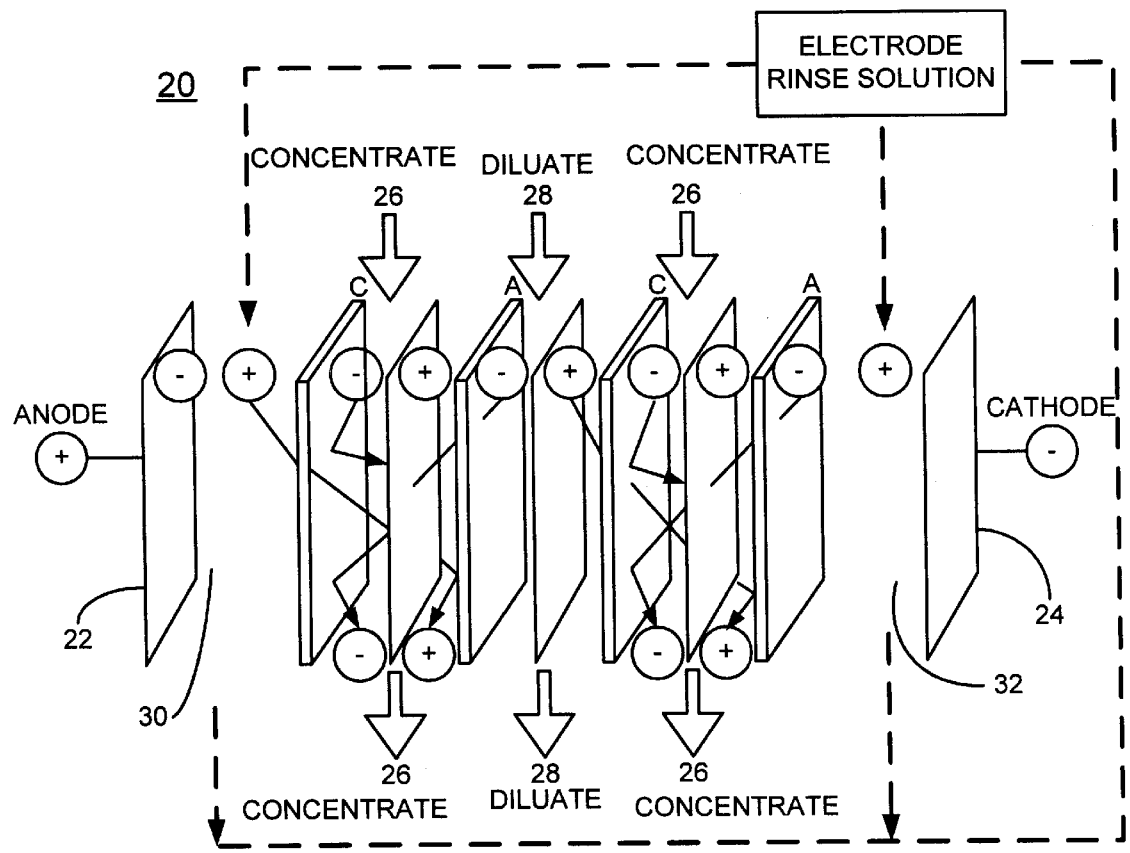
FIG. 1 is diagrammatic representation of a typical electrodialysis apparatus.
Figure 2:
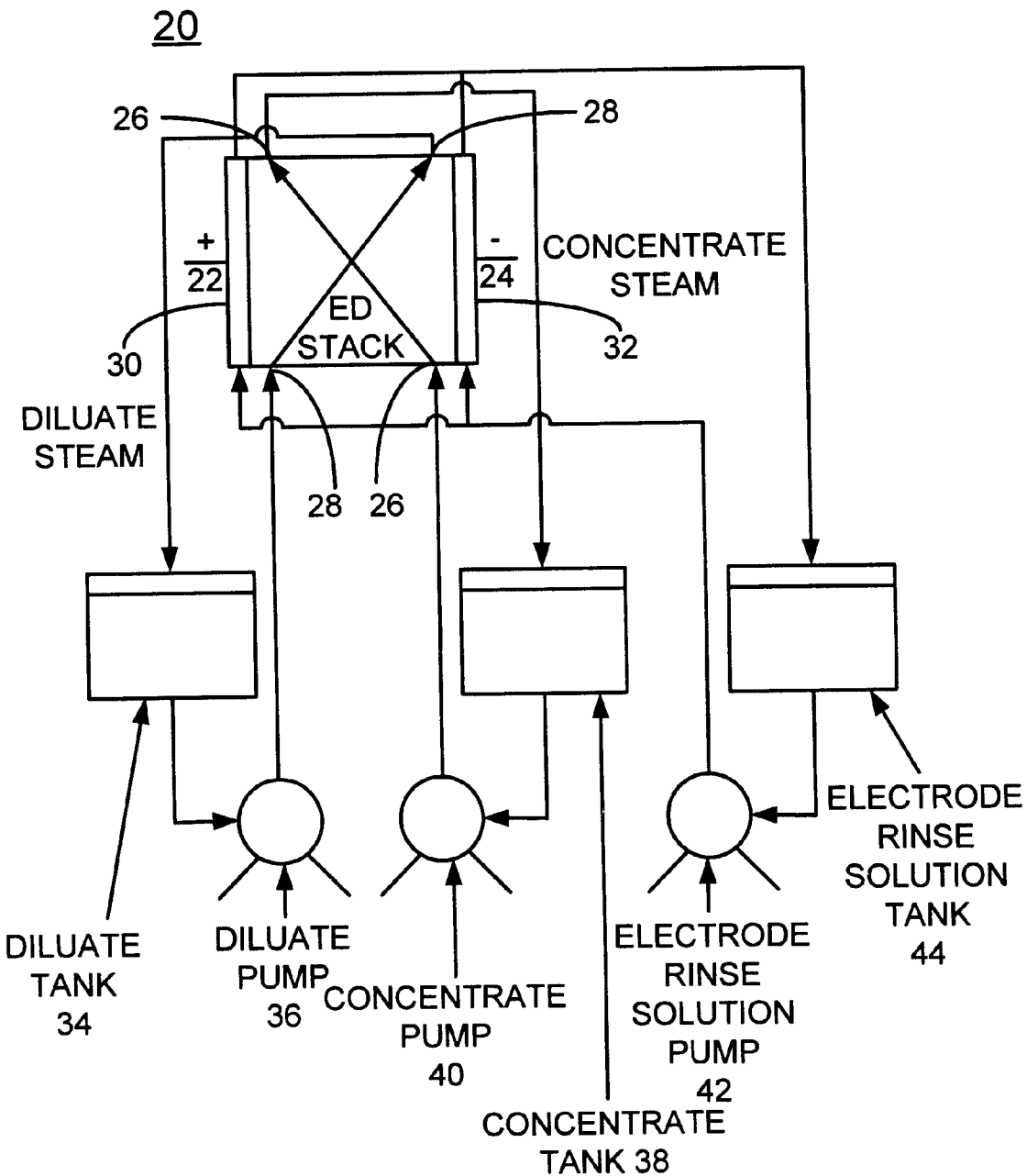
FIG. 2 is a schematic flow diagram for the electrodialysis apparatus illustrated in FIG. 1.
Figure 3:
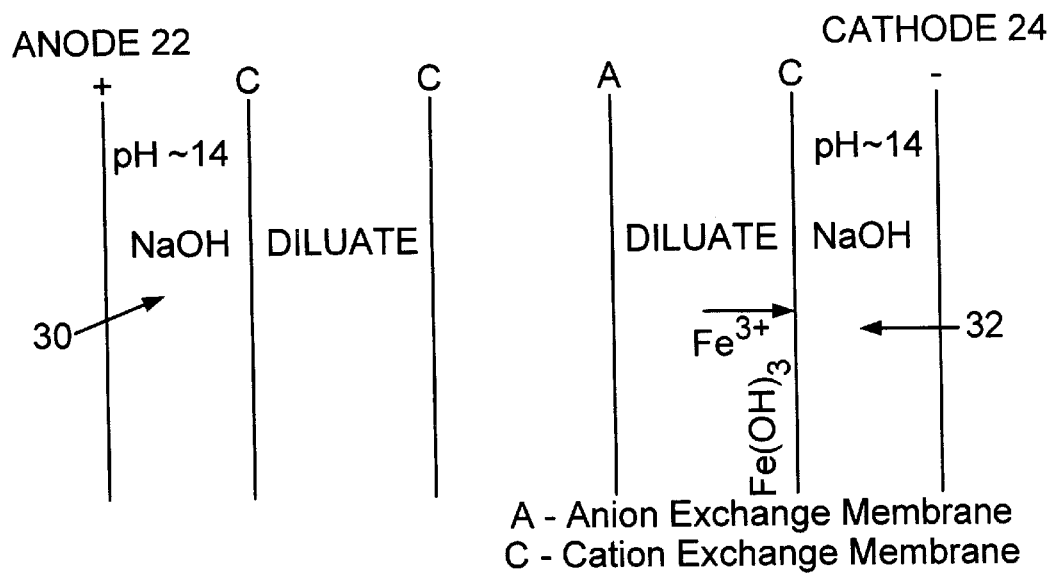
FIGS. 3–8 are diagrammatic representations relating to the formation of precipitates on an ion selective membrane adjacent the cathode of an electrodialysis apparatus and the liberation of chlorine gas from adjacent the anode of an electrodialysis apparatus when the same electrode rinse solution is used for the compartments adjacent the cathode and anode of the electrodialysis apparatus.
Figure 4:
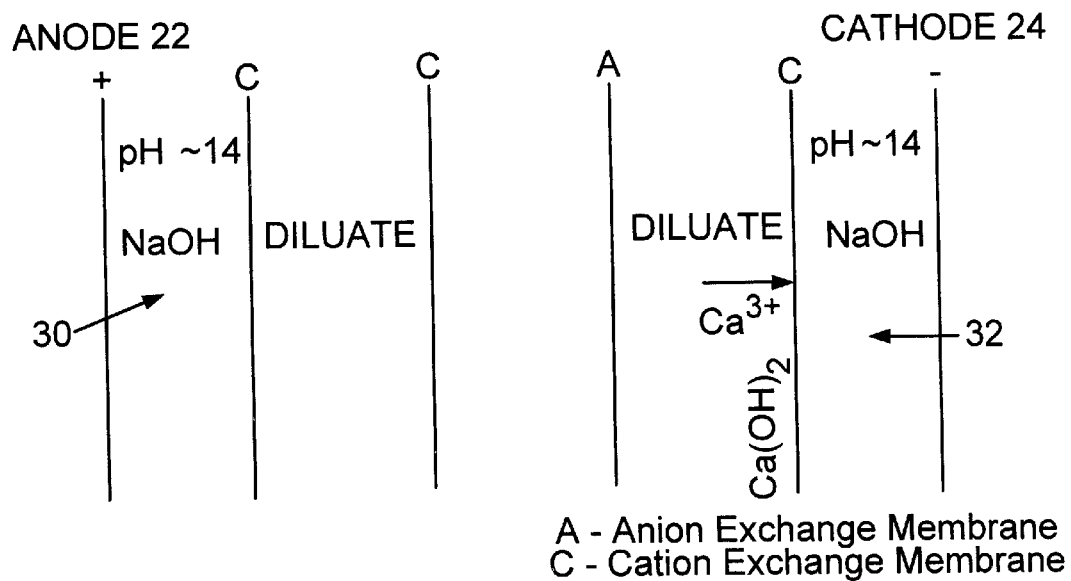
Figure 5:
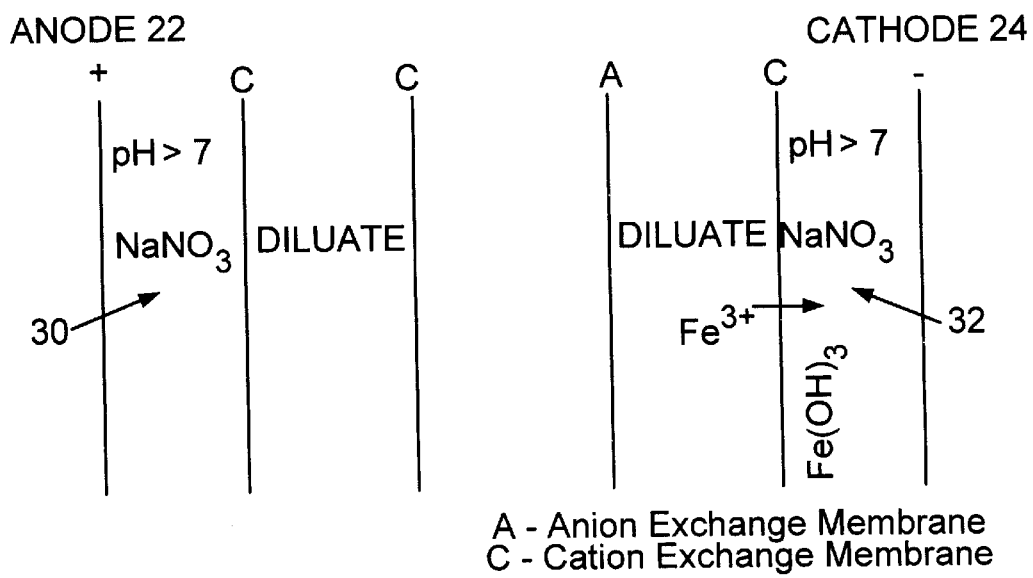
Figure 6:
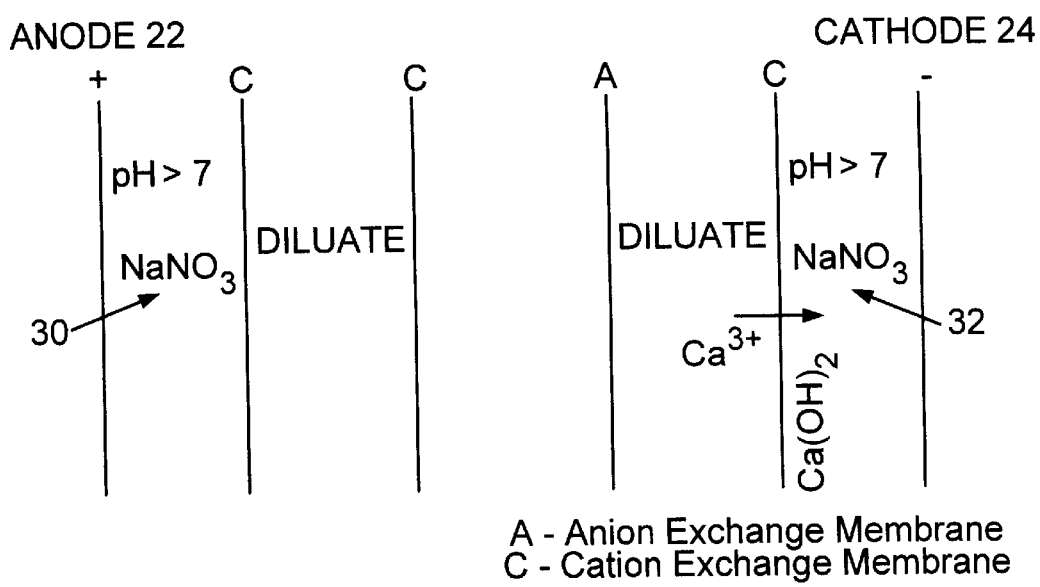
Figure 7:
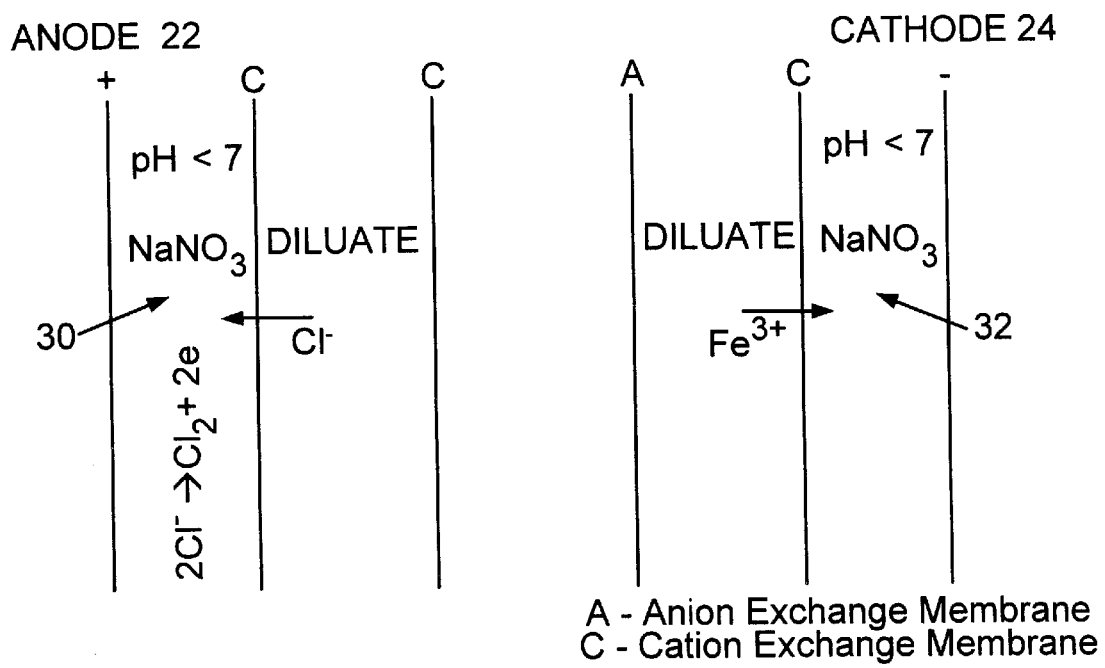
Figure 8:
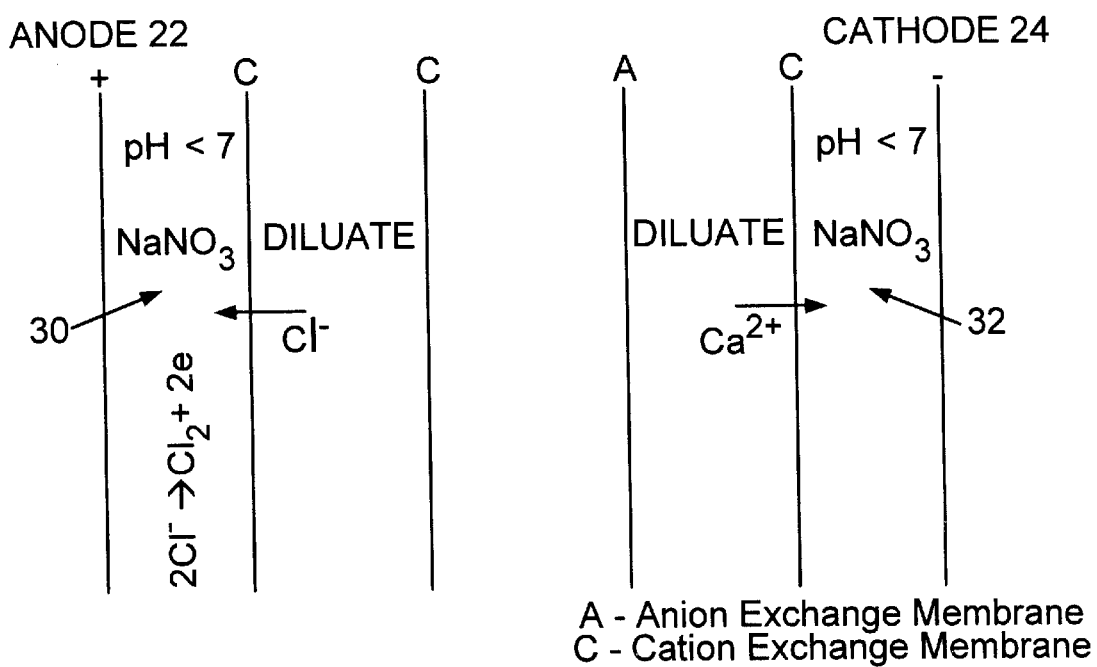
Figure 9:
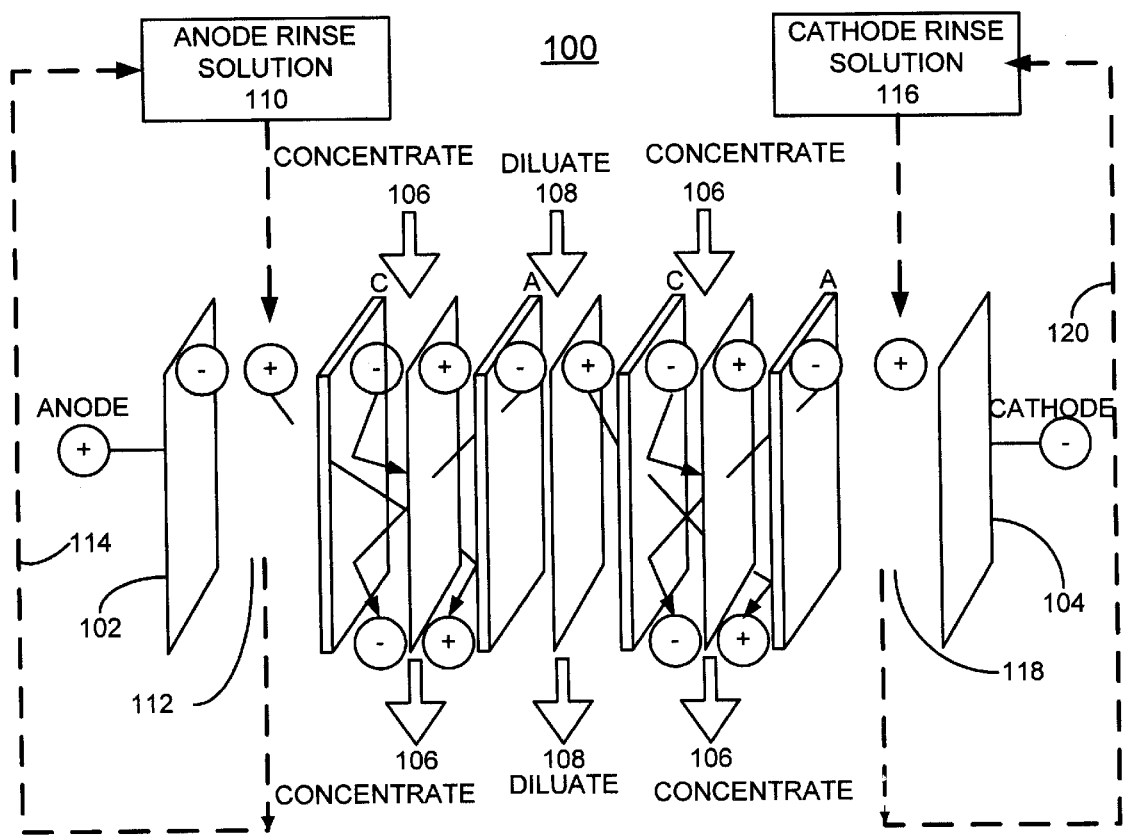
FIG. 9 is diagrammatic representation of a electrodialysis apparatus embodying the present invention.

Referring now more specifically to FIG. 9 of the drawings, therein is disclosed a diagrammatic representation of an electrodialysis apparatus that is generally designated by the reference numeral 100 and that embodies the present invention. The electrodialysis apparatus includes a series or stack of alternating cation semi-permeable, ion-selective membranes C and anion semi-permeable, ion-selective membranes A disposed between a positive DC potential anode electrode 102 and a negative DC potential cathode electrode 104. The cation selective membranes C and the anion selective membranes A form compartments therebetween. In the electrodialysis apparatus 100 illustrated in FIG. 9, only three such compartments are shown as being formed by the stack of ion selective membranes C and A. However, it should be understood that any desired number of ion selective membranes C and A can be used to form a desired number of such compartments. As indicated by arrows 106 in FIG. 9, a concentrate solution flows through alternate ones of the compartments formed between the stack of ion selective membranes C and A and as indicated by arrows 108 in FIG. 9, a diluate solution flows through the other ones of the alternate compartments such that the concentrate and diluate solutions are separated from each other by the ion selective membranes C and A. The diluate solution may contain salt (for example NaCl) or impurities (for example, sodium chloride (NaCl) in acidic magnesium chloride ($MgCl_2$) solution, or calcium chloride ($CaCl_2$) in sodium chloride (NaCl) and potassium chloride (KCl) solutions). Due to the potential maintained across each of the compartments and cation and anion selective membranes separating the compartments, cations (such as acid (H), sodium (Na), magnesium (Mg), calcium (Ca) and potassium (K)) and anions (such as chloride (Cl)) as well as water (hydration shell and osmosis) will migrate from the diluate solution to the concentrate solution. Once these cations and anions are in the concentrate solution, they can be recovered and used for commercial purposes. Additionally, the purified or salt-depleted diluate solution may also have an increased commercial value.

Figure 11:
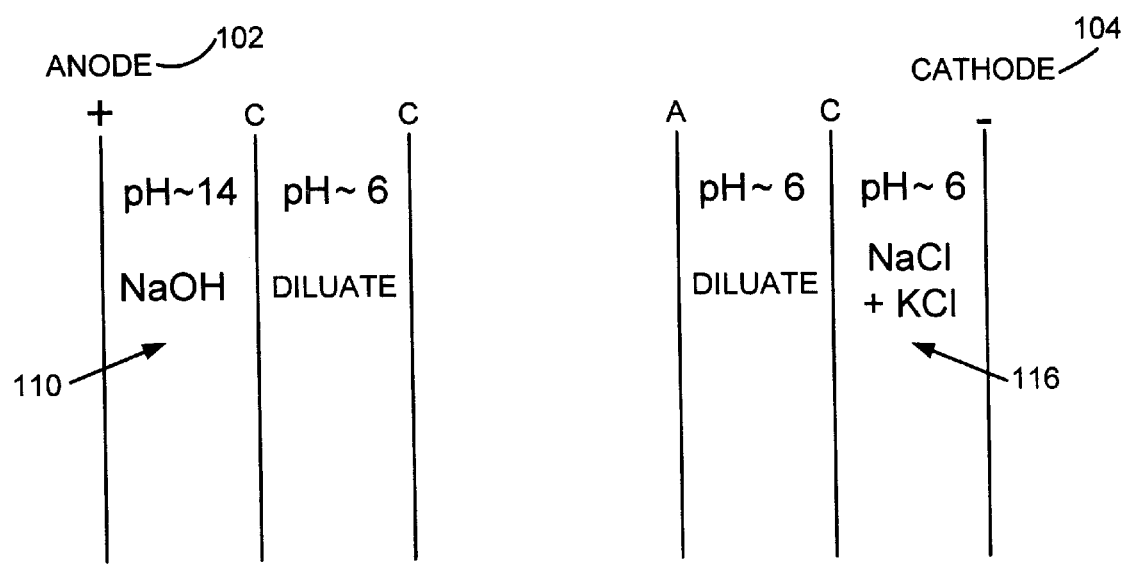
FIG. 11 is a diagrammatic representation relating to the electrode rinse solution used in the electrodialysis apparatus of FIG. 9.

An anode electrode rinse solution generally designated by the numeral 110 is circulated through an outer most compartment 112 adjacent to the anode electrode 102 as indicated by a dashed line 114 and a cathode electrode rinse solution generally designated by the numeral 116 is circulated through an outer most compartment 118 adjacent to the cathode electrode 104 as indicated by a dashed line 120. In one embodiment of the present invention, the anode electrode rinse solution 110 is sodium hydroxide (NaOH) maintained at a basic pH level that is near 14 and the cathode electrode rinse solution 116 is sodium chloride (NaCl) and/or potassium chloride (KCl) that are maintained at an acidic pH level of about 6. In this regard, reference can be made to FIG. 11 which shows diagrammatically what can be used as the anode electrode rinse solution 110 and the cathode electrode rinse solution 116 and the pH levels for those solutions 110 and 116.

The acidic cathode electrode rinse solution 116 tends to prevent the formation of detrimental precipitates (such as iron, manganese, calcium and magnesium hydroxides) on the cation selective membrane C adjacent the cathode electrode 104 or the liberation of ammonia adjacent the cathode electrode 104 whereas the basic anode electrode rinse solution 110 tends to prevent the liberation of chlorine gas from adjacent the anode electrode 102. During the electrodialysis process, hydrogen tends to be evolved at the cathode electrode 104 and oxygen tends to be evolved at the anode electrode 102. As a result, the pH level of the cathode electrode rinse solution 116 that is circulating through the compartment 118 adjacent the cathode electrode 104 tends to be increased so acid has to be continuously added to the cathode electrode rinse solution 116 to maintain its desired acidic pH level and the pH level of the anode electrode rinse solution 110 that is circulating through the compartment 112 adjacent the anode 102 tends to be decreased so a base has to be continuously added to the anode electrode rinse solution 110 to maintain its desired basic pH level.

Figure 10:
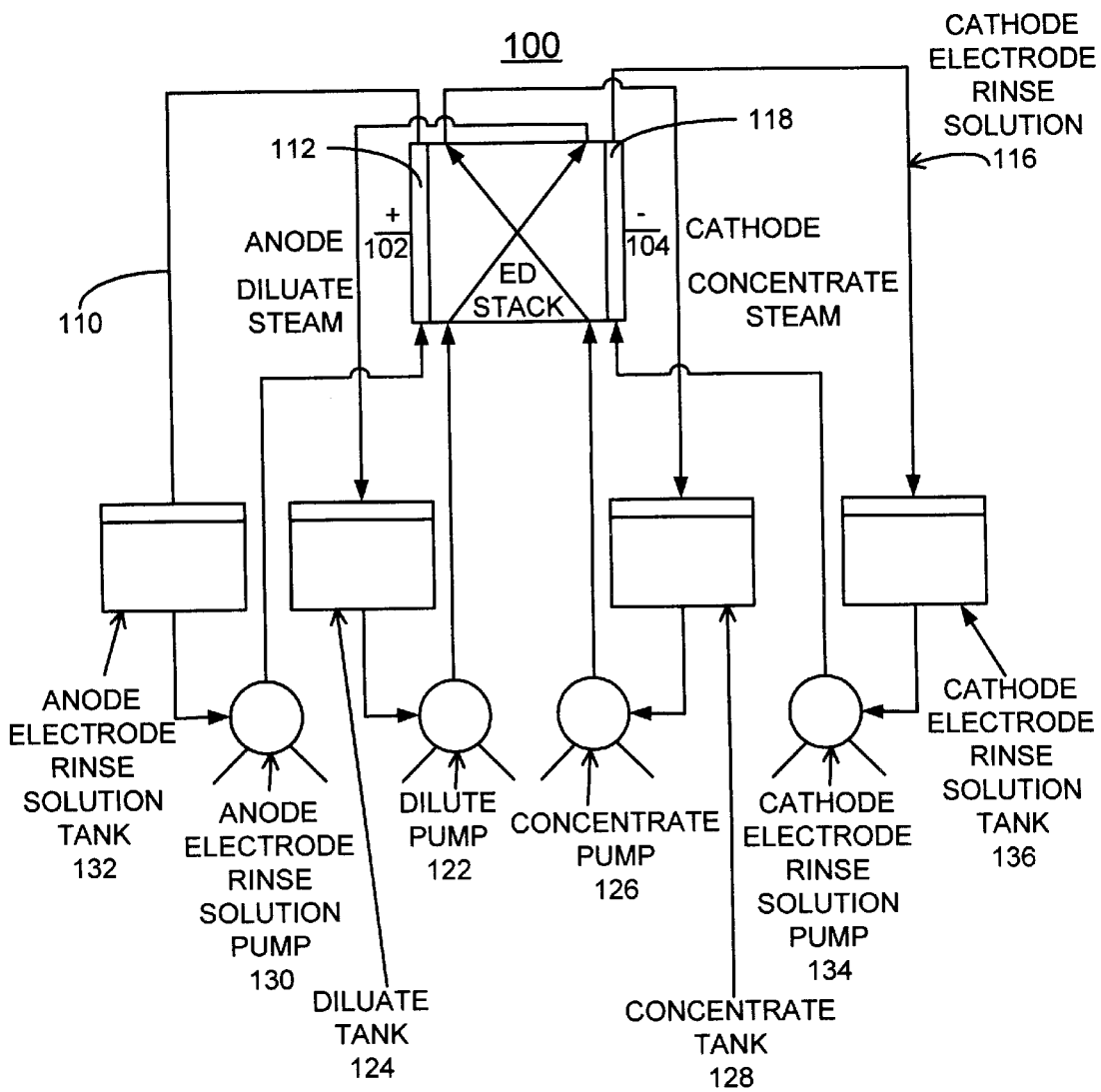
FIG. 10 is a schematic flow diagram for the electrodialysis apparatus illustrated in FIG. 9.

In this regard, how the fluids flow through the electrodialysis apparatus 100 is shown schematically in FIG. 10 of the drawings. As shown therein, a diluate pump 122 pumps the diluate solution from and to a diluate tank 124 through the diluate compartments formed between the cation C and anion A selective membranes (labeled ED stack in FIG. 10). In a like manner, a concentrate pump 126 pumps concentrate solution from and to a concentrate tank 128 through the concentrate compartments formed between the cation C and anion A selective membranes (ED stack). As the diluate solution flows through the diluate compartments, cations, anions and water from the diluate solution migrate through the cation C and anion A selective membranes to the concentrate solution. In addition, an anode electrode rinse solution pump 130 pumps the anode electrode rinse solution 110 from and to an anode electrode rinse solution tank 132 through the compartment 112 adjacent the anode 102. Likewise, a cathode electrode rinse solution pump 134 pumps the cathode electrode rinse solution 116 from and to a cathode electrode rinse solution tank 136 through the compartment 118 adjacent the cathode 104. As previously indicated, the base that is added to the anode electrode rinse solution 110 to maintain its desired basic pH level can be added in the anode electrode rinse solution tank 132 and the acid that is added to the cathode electrode rinse solution 116 to maintain its desired acidic pH level can be added in the cathode electrode rinse solution tank 136.

Obviously, many modifications and variations of the present invention are possible in light of the above teachings. For example different cathode and anode electrode rinse solutions can be utilized at desired pH levels depending on what is contained in the diluate solution that is being processed in the electrodialysis apparatus. Thus, it is to be understood that, within the scope of the appended claims, the invention may be practiced otherwise than as specifically described above.

What is claimed and desired to be secured by Letters Patent of the United States is:

1. Apparatus for electrodialysis of aqueous fluids to transfer dissolved salts or impurities from a diluate solution into a concentrate solution comprising:
   an electrodialysis unit including a stack of semipermeable, ion selective membranes and including first and second electrodes for applying an electric field with respect to said stack of ion-selective membranes so as to cause ions to migrate from the diluate solution to the concentrate solution through said ion selective membranes, said electrodialysis unit defining at least one diluate solution compartment and at least one concentrate solution compartment, said diluate solution compartment and said concentrate solution compartment being separated by said ion-selective membranes;
   a first electrode compartment adjacent said first electrode and a second electrode compartment adjacent said second electrode; said first electrode being a cathode electrode and said second electrode being an anode electrode; and
   a first electrode rinse solution circulated through said first electrode compartment and a second electrode rinse solution circulated through said second electrode compartment; said first electrode rinse solution being an acidic cathode electrode solution to prevent predefined precipitates adjacent said first cathode electrode and said second electrode rinse solution being a basic anode electrode rinse solution to prevent chlorine gas liberation adjacent said second anode electrode.

2. An apparatus for electrodialysis of aqueous fluids as set forth in claim 1 wherein said first electrode rinse solution is sodium chloride and/or potassium chloride and said second electrode rinse solution is sodium hydroxide.

3. An apparatus for electrodialysis of aqueous fluids as set forth in claim 1 wherein said first electrode rinse solution is sodium chloride and/or potassium chloride having an acidic pH level and said second electrode rinse solution is sodium hydroxide having a basic pH level.

4. An apparatus for electrodialysis of aqueous fluids as set forth in claim 3 wherein the pH level of said first electrode rinse solution is approximately 6 and the pH level of said second electrode rinse solution is approximately 14.

5. An apparatus for electrodialysis of aqueous fluids as set forth in claim 1 wherein said diluate solution includes sodium chloride, magnesium chloride, calcium chloride, and/or potassium chloride.

6. An apparatus for electrodialysis of aqueous fluids as set forth in claim 1 wherein said ion-selective membranes comprise alternating cation-selective and anion-selective membranes.

7. A process of electrodialysis of aqueous fluids to transfer dissolved salts or impurities from a diluate solution into a concentrate solution comprising the steps of:
   circulating said diluate solution through at least one diluate solution compartment in an electrodialysis unit and circulating said concentrate solution through at least one concentration solution compartment in said electrodialysis apparatus, said electrodialysis apparatus includes a stack of semipermeable, ion selective membranes so that said diluate solution compartment and said concentrate solution compartment are separated by ion-selective membranes;
   applying an electric field from first and second electrodes with respect to said stack of ion-selective membranes so as to cause ions to migrate from said diluate solution to said concentrate solution through said ion selective membranes; said first electrode being a cathode electrode and said second electrode being an anode electrode;
   circulating a first acidic cathode electrode rinse solution through a first electrode compartment adjacent said first electrode for preventing formation of predefined precipitates adjacent said first cathode electrode; and
   circulating a second basic anode electrode rinse solution through a second electrode compartment adjacent said second electrode for preventing chlorine gas liberation adjacent said second anode electrode.

8. A process of electrodialysis of aqueous fluids as set forth in claim 7 wherein said first electrode rinse solution is sodium chloride and/or potassium chloride and said second electrode rinse solution is sodium hydroxide.

9. A process of electrodialysis of aqueous fluids as set forth in claim 7 wherein said first electrode rinse solution is sodium chloride and/or potassium chloride having an acidic pH level and said second electrode rinse solution is sodium hydroxide having a basic pH level.

10. A process of electrodialysis of aqueous fluids as set forth in claim 9 wherein the pH level of said first electrode rinse solution is approximately 6 and the pH level of said second electrode rinse solution is approximately 14.

11. A process of electrodialysis of aqueous fluids as set forth in claim 9 including adding an acid to said first electrode rinse solution to maintain the pH level of said first electrode rinse solution at an acidic level and adding a base to said second electrode rinse solution to maintain the pH level of said second electrode rinse solution at a basic level.

12. A process of electrodialysis of aqueous fluids as set forth in claim 7 wherein said diluate solution includes sodium chloride, magnesium chloride, calcium chloride, and/or potassium chloride.

13. A process of electrodialysis of aqueous fluids as set forth in claim 7 wherein said ion-selective membranes comprise alternating cation-selective and anion-selective membranes.

\* \* \* \* \*